(12) United States Patent
Oka

(10) Patent No.: US 9,060,194 B2
(45) Date of Patent: Jun. 16, 2015

(54) VIDEO REPRODUCTION APPARATUS, CONTROL METHOD THEREOF, AND COMPUTER-READABLE STORAGE MEDIUM STORING PROGRAM

(75) Inventor: Hiroto Oka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 13/395,547

(22) PCT Filed: May 11, 2011

(86) PCT No.: PCT/JP2011/002611
§ 371 (c)(1),
(2), (4) Date: Mar. 12, 2012

(87) PCT Pub. No.: WO2011/142126
PCT Pub. Date: Nov. 17, 2011

(65) Prior Publication Data
US 2012/0170908 A1  Jul. 5, 2012

(30) Foreign Application Priority Data

May 13, 2010 (JP) .................................. 2010-111540
Apr. 28, 2011 (JP) .................................. 2011-101306

(51) Int. Cl.
G06F 3/00     (2006.01)
G06F 3/048    (2013.01)
H04N 9/80     (2006.01)
H04N 21/258   (2011.01)
(Continued)

(52) U.S. Cl.
CPC .... *H04N 21/25825* (2013.01); *G06F 17/30861* (2013.01); *H04N 21/2343* (2013.01); *H04N 21/47202* (2013.01)

(58) Field of Classification Search
CPC .... G11B 27/034; G11B 27/105; G11B 27/34; G11B 27/326; G06F 3/048
USPC .......... 386/239, 240, 243, 248, 282; 715/716, 715/719, 781, 783
See application file for complete search history.

(56) References Cited

U.S. PATENT DOCUMENTS 8,255,815 B2 *  8/2012  Ording ........................ 715/764
2006/0263048 A1 * 11/2006  Sato et al. ..................... 386/95
(Continued)

FOREIGN PATENT DOCUMENTS

CN     1830018 A    9/2006
CN   101399976 A    4/2009
(Continued)

OTHER PUBLICATIONS

"Mac OS X 10.6 Snow Leopard makes it possible to playback a video file or an audio file as it is from "icon" display in the Finder."; Inforati.

*Primary Examiner* — Daquan Zhao
(74) *Attorney, Agent, or Firm* — Canon U.S.A., Inc. IP Division

(57) ABSTRACT

The present invention is directed to a technique capable of preventing resources from being wastefully used due to continuous reproduction of video data which cannot be viewed by a user as the video data does not exist in a display range of a window or preventing the user from missing the video data. A CPU of a video transmission apparatus determines whether a reproduction frame of video data during reproduction is within a display range of a window. As a result of the determination, if the reproduction frame is not within the display range, the reproduction of the video data is stopped and a reproduction position is stored.

22 Claims, 8 Drawing Sheets

(51) Int. Cl.
  *G06F 17/30* (2006.01)
  *H04N 21/2343* (2011.01)
  *H04N 5/93* (2006.01)
  *G11B 27/00* (2006.01)
  *H04N 21/472* (2011.01)

(56) References Cited

U.S. PATENT DOCUMENTS

2006/0277470 A1* 12/2006 Schneider et al. ............ 715/719
2007/0136685 A1* 6/2007 Bhatla et al. ................... 715/800
2009/0080860 A1 3/2009 Nakano
2010/0153544 A1 6/2010 Krassner
2011/0113486 A1* 5/2011 Hunt et al. ...................... 726/19
2013/0198608 A1* 8/2013 Krassner et al. ............... 715/234

FOREIGN PATENT DOCUMENTS

| JP | 2009-081732 A | 4/2009 |
| JP | 2009-117927 A | 5/2009 |
| JP | 2010-062661 A | 3/2010 |

* cited by examiner

Fig. 6A

```
<OBJECT ID="Controller">
   CLASSID="clsid:..."
   <PARAM...>
   ...
</OBJECT>
```
601

```
<OBJECT ID="MoviePlayer">
   CLASSID="clsid:..."
   <PARAM...>
   ...
</OBJECT>
```
602

...

...

```
<SCRIPT LANGUAGE="VBScript">
<!--
   Sub MoviePlayer_OnExit()
      Controller.SetPlayerExit()
   End Sub Sub Controller_OnStopPlayer()
      MoviePlayer.Stop()
   End Sub

...
->
</SCRIPT>
```

Fig. 6B

```
   Sub MoviePlayerA_OnEnter()
      Controller.SetPlayerEntrance()
   End Sub Sub Controller_OnStartPlayerB()
   MoviePlayerBStart()
   End Sub
```

VIDEO REPRODUCTION APPARATUS, CONTROL METHOD THEREOF, AND COMPUTER-READABLE STORAGE MEDIUM STORING PROGRAM

TECHNICAL FIELD

The present invention relates to a video reproduction apparatus configured to reproduce video data including moving image data and audio data and a control method and a program thereof.

BACKGROUND ART

Conventionally, a user of a communication apparatus displays image data by downloading the image data from a web server to the communication apparatus using a web browser and a plug-in.

If the user operates the communication apparatus and resizes or scrolls the window of the web browser while the video data is being reproduced, a display state of a reproduction frame of the video data in the window may be changed. Then, even if the reproduction frame of the video data is not actually displayed in the window, the reproduction processing of the video data will be continuously executed. Thus, although the user is unable to view the video data, the resources of the communication apparatus will be wasted. Further, the sound irrelevant to the content which is displayed in the window may be continuously reproduced and the user will be confused.

SUMMARY OF INVENTION

The present invention is directed to a technique capable of preventing resources from being wastefully used due to continuous reproduction of video data which cannot be viewed by a user as the video data does not exist in a display range of a window or preventing the user from missing the video data.

According to an aspect of the present invention, a video reproduction apparatus includes a reproduction unit configured to reproduce video data in a window, an update unit configured to update a display content in the window if the window is scrolled, and a stopping unit configured to stop reproduction of the video data if the video data is not displayed in the window as a result of the update.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 6A illustrates contents of a script.
FIG. 6B illustrates contents of a script.

DESCRIPTION OF EMBODIMENTS

Various exemplary embodiments, features, and aspects of the invention will be described in detail below with reference to the drawings.

Figure 1:
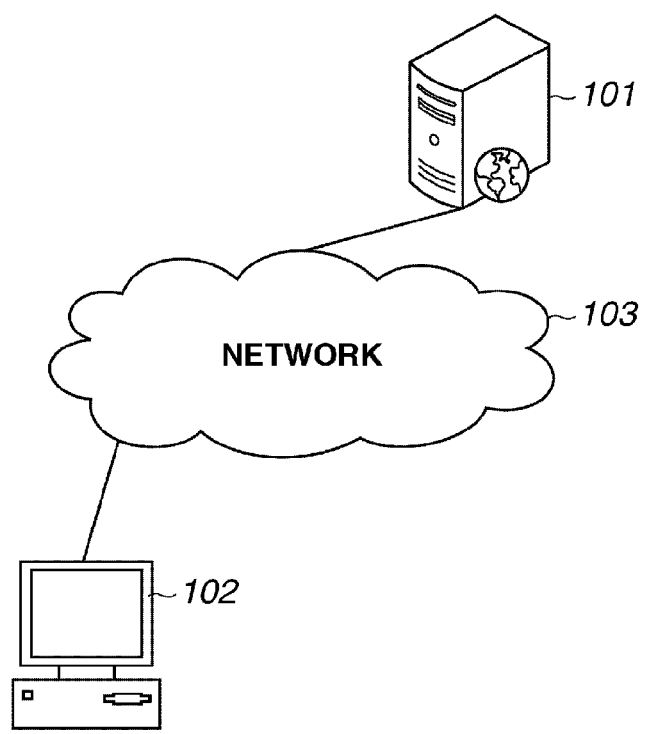
FIG. 1 is a block diagram illustrating a configuration of a video reproduction system.

A configuration of a video reproduction system according to a first exemplary embodiment will be described below with reference to a block diagram illustrated in FIG. 1. A video transmission apparatus 101 and a video reproduction apparatus 102 are connected via a network.

Figure 2:
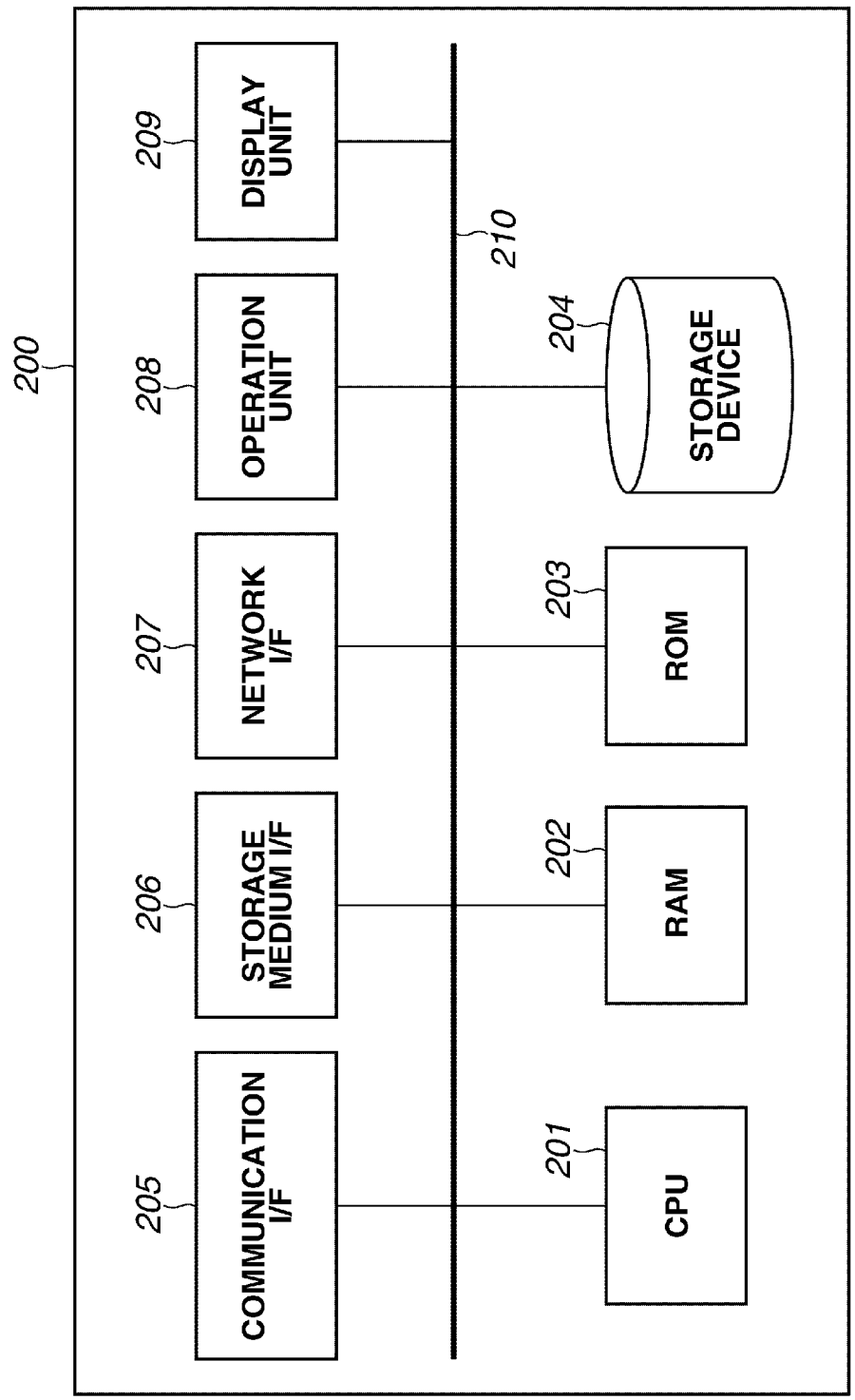
FIG. 2 is a block diagram illustrating a configuration of a video reproduction apparatus.

A configuration of a computer apparatus 200 that realizes the video reproduction apparatus 102 according to the present exemplary embodiment will be described below with reference to a block diagram illustrated in FIG. 2. A central processing unit (CPU) 201 is a control unit used for controlling the entire computer apparatus 200. A random access memory (RAM) 202 temporary stores a program or data supplied from an external apparatus or the like.

A read-only memory (ROM) 203 stores a program or a parameter that requires no changes. The program stored in the ROM 203 is loaded onto the RAM 202 when the computer apparatus 200 is started, and then executed by the CPU 201.

A storage device 204 is a hard disk or the like that stores various programs, an operating system (OS), a web browser program, and a plug-in program. The program stored in the storage device 204 is loaded onto the RAM 202 according to a user's operation and executed by the CPU 201.

A communication interface (I/F) 205 is a connection unit used for communication with an external device, and is a universal serial bus (USB) port or the like. A storage medium interface 206 is an insertion unit used for reading and writing of an external storage medium such as a memory card or a digital versatile disk (DVD). A network interface 207 is a connection unit used for connecting a network cable.

An operation unit 208 may include a keyboard or a mouse which is used when the user inputs information or instructions in the computer apparatus 200. A display unit 209 is a monitor or the like for displaying an image or a graphical user interface (GUI) screen. A bus 210 communicably connects each of the modules 201 to 209.

The video reproduction apparatus 102 according to the present exemplary embodiment stops reproduction of video data when it determines that a display state of a reproduction frame of the video data in a window is changed to a non-display state during the reproduction of the video data. The reproduction frame is changed to a non-display state in the window if the display content in the window is updated by the user resizing or scrolling the window of the web browser.

Figure 3:
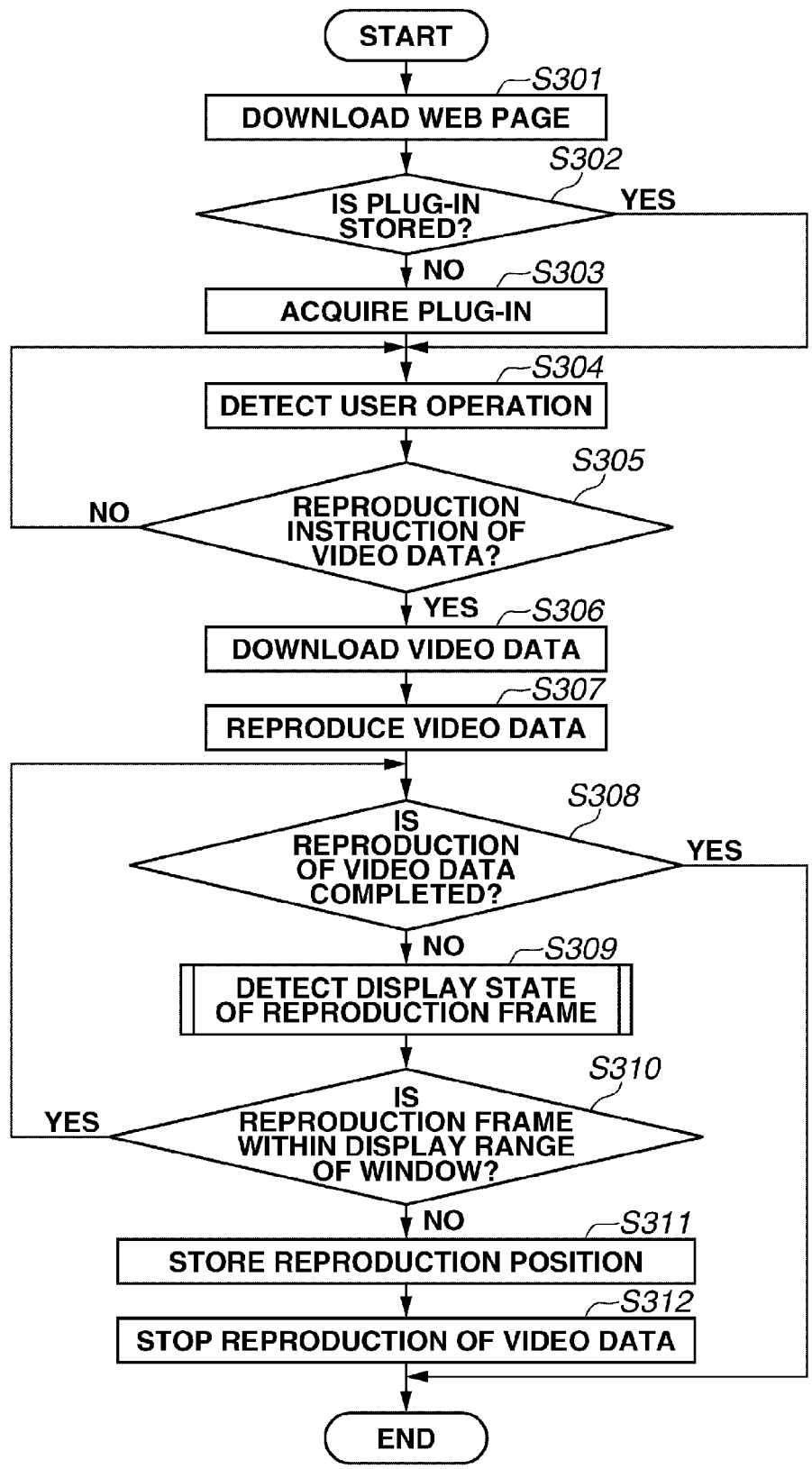
FIG. 3 is a flowchart illustrating an operation of the video reproduction apparatus.

Operations of the video reproduction apparatus 102 according to the present exemplary embodiment will be described with reference to the flowchart in FIG. 3. The operations described below are realized by the CPU 201 of the video reproduction apparatus 102 starting the OS or the web browser and performing operations according to the OS or the web browser. Further, the video reproduction apparatus 102 can be realized by various terminals that include a communication function and a display function. The reproducing apparatus 102 is, for example, a personal computer, a cellular phone, or a digital camera.

In step S301, the CPU 201 accesses the video transmission apparatus 101 via the network interface 207 according to a uniform resource locator (URL) input in the window of the web browser and downloads a web page.

In step S302, the CPU 201 determines whether a predetermined plug-in is stored in the storage device 204. If the predetermined plug-in is not stored (NO in step S302), the processing proceeds to step S303. In step S303, the CPU 201 downloads a plug-in from the video transmission apparatus 101 or another web server apparatus and stores it in the storage device 204. In step S304, the CPU 201 detects an operation of the user.

In step S305, the CPU 201 determines whether the user's operation is related to a reproduction instruction of video data. If the operation is determined as the reproduction instruction of video data (YES in step S305), the processing proceeds to step S306. In step S306, the CPU 201 downloads the video data from the video transmission apparatus 101 according to a file path described in the web page and stores the video data in the storage device 204. In step S307, after the download is completed, the CPU 201 reads out the video data from the storage device 204 and reproduces it in a reproduction frame.

In step S308, the CPU 201 determines whether the reproduction of the video data is finished. If the reproduction is not yet finished (NO in step S308), the processing proceeds to step S309. In step S309, the CPU 201 executes an operation according to the plug-in or the OS, and detects a display state of the reproduction frame. In step S310, the CPU 201 determines whether the reproduction frame is within a display range of the window.

Figure 4A:
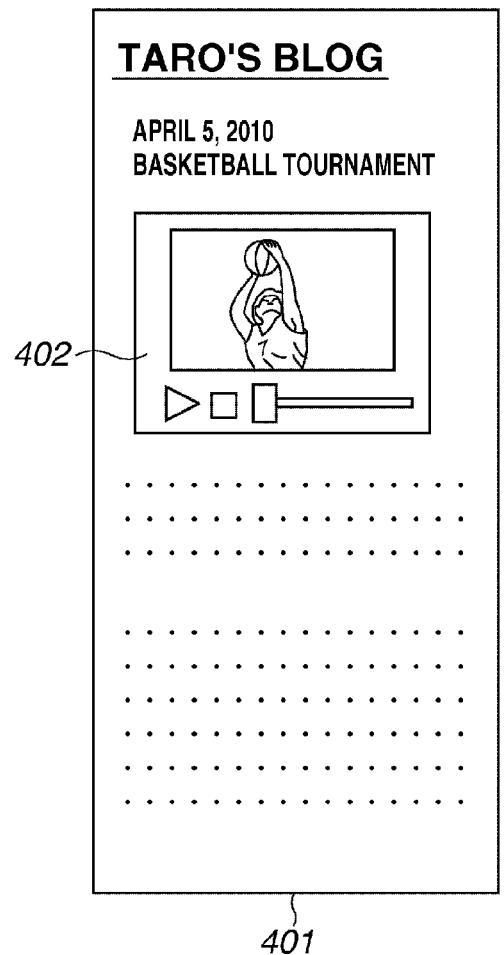
FIG. 4A illustrates display contents of a web page.
Figure 4B:
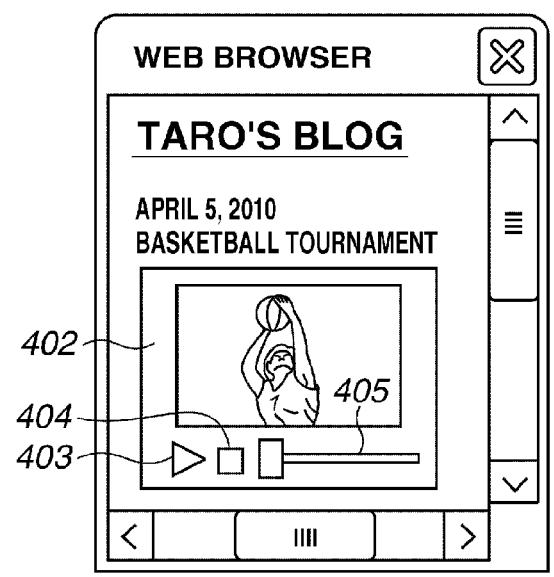
FIG. 4B illustrates display contents of a web page.
Figure 4C:
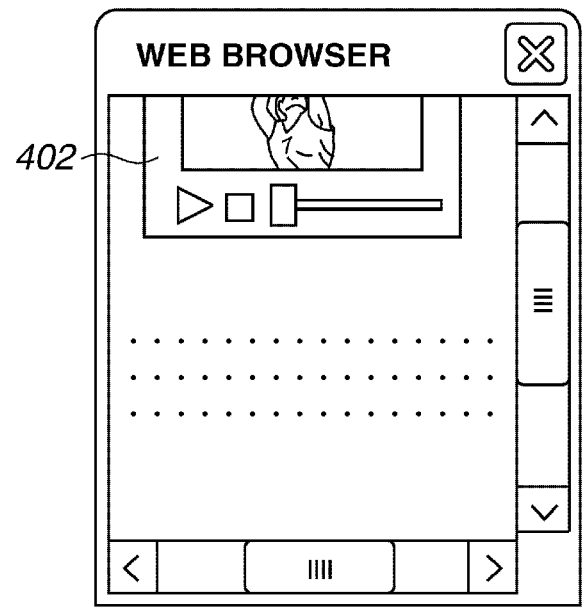
FIG. 4C illustrates display contents of a web page.
Figure 4D:
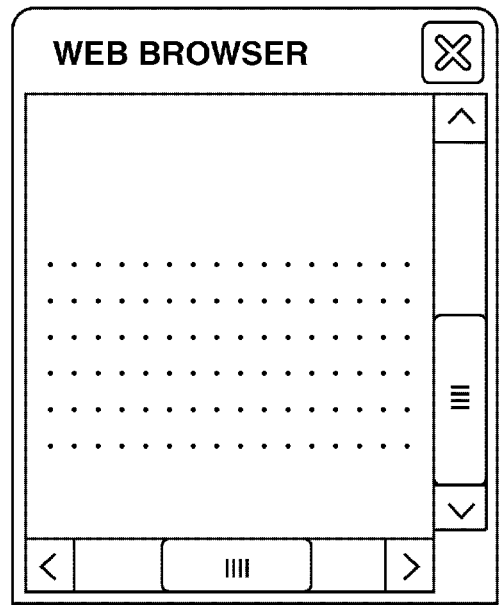
FIG. 4D illustrates display contents of a web page.

For example, if the web page is similar to what is illustrated in FIG. 4A, the web page is displayed in either of the following states. More specifically, the entire reproduction frame is included in the display range of the window of the web page (FIG. 4B), a part of the reproduction frame is included (FIG. 4C), or the reproduction frame is not included (FIG. 4D). The web pages in FIGS. 4A to 4D include a web page 401, a reproduction frame 402, a button 403 used for inputting a reproduction-start instruction, a button 404 for inputting a reproduction-stop instruction, a bar 405 that indicates a reproduction position.

In step S310, if the CPU 201 determines that the reproduction frame is not within the display range of the window (NO in step S310), the processing proceeds to step S311. In step S311, the CPU 201 stores the reproduction position of the video data in the RAM 202. Then in step S312, the CPU 201 stops the reproduction of the video data.

In step S308, if the CPU 201 determines that the reproduction of the video data has been finished (YES in step S308), then the processing ends. In step S310, if the CPU 201 determines that the reproduction frame is displayed (YES in step S310), then the processing returns to step S308, and the subsequent processing is repeated.

Then, the user performs the operation again and if the reproduction frame of the video data whose reproduction is stopped is displayed within the window and if the user gives a reproduction instruction, the CPU 201 reads out the reproduction position from the RAM 202 and starts the reproduction of the video data from that position.

Figure 5:
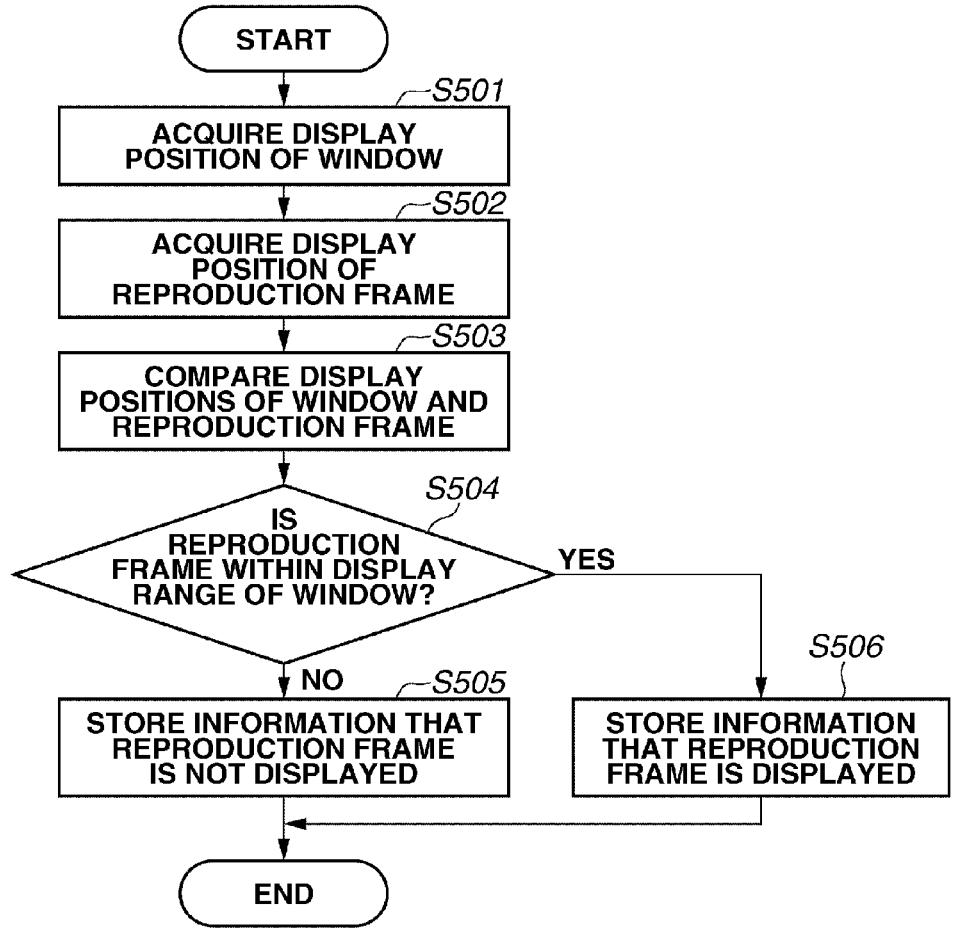
FIG. 5 is a flowchart illustrating an operation of the video reproduction apparatus.

Next, details of the operation in step S309, which is the operation of the CPU 201 detecting the change in the display state of the reproduction frame of the video data, will be described with reference to FIG. 5. In step S501, the CPU 201 acquires coordinates (an upper left corner ($L_x$, $L_y$) and a lower right corner ($R_x$, $R_y$) of the window) of the display position in the window of the web browser from the OS.

In step S502, the CPU 201 acquires coordinates (an upper left corner ($l_x$, $l_y$) and a lower right corner ($r_x$, $r_y$) of the reproduction frame) of the display position of the reproduction frame from the OS. The CPU 201 can acquire the coordinates indicating the display position and a size of the window from the OS using the reproduction frame or a window handle of the window of the web browser. The plug-in includes information regarding the reproduction frame and the window handle.

In step S503, the CPU 201 compares the coordinates of the display positions of the window and the reproduction frame. Then in step S504, the CPU 201 determines whether the reproduction frame is within the display range of the window. If at least one out of the following conditions, i.e. $l_x < L_x$, $r_x > R_x$, $l_y > L_y$, and $r_y < R_y$, is satisfied, the CPU 201 determines that the reproduction frame is not included in the display range of the window (NO in step S504), and the processing proceeds to step S505. In step S505, the CPU 201 stores, in the RAM 202, information indicating that the reproduction frame is not displayed.

On the other hand, if any of the conditions, $l_x < L_x$, $r_x > R_x$, $l_y > L_y$, and $r_y < R_y$ is not satisfied, then the CPU 201 determines that the reproduction frame is within the display range of the window (YES in step S504), and the processing proceeds to step S506. In step S506, the CPU 201 stores, in the RAM 202, information indicating that the reproduction frame is being displayed.

Next, an example of a script of the web page according to the present exemplary embodiment will be described with reference to FIG. 6A. The script includes a control plug-in 601 and a video reproduction plug-in 602. The CPU 201 identifies the control plug-in 601 by identification (ID) "Controller" and identifies the video reproduction plug-in 602 by ID "MoviePlayer". The video reproduction plug-in 602 includes a display state, a reproduction state, a reproduction position, volume, and ON/OFF of a mute.

If the reproduction frame is not within the display range of the window, an event "OnExit" is generated, and the CPU 201 calls a function "MoviePlayerA_OnExit". Then, when a method "SetPlayerExit" for the control plug-in is called, an event "OnStopPlayer" for stopping reproduction of video data is generated, and the CPU 201 calls a reproduction stop method "Stop" of the video reproduction plug-in.

According to the present exemplary embodiment, the CPU 201 determines that the reproduction frame is not within the display range of the window when a portion of the reproduction frame is not displayed in the window, and stops the reproduction of the video data.

However, the determination is not limited to such a criterion, and the CPU 201 can determine that the reproduction frame is not within the display range of the window according to a size of a portion of the reproduction frame which is no longer displayed in the display range, and then stop the reproduction of the video data. In this case, in step S310, the CPU 201 detects the area of a portion which is no longer included in the window, and if the ratio of that area with respect to the area of the whole reproduction frame exceeds a predetermined value, the CPU 201 determines that the reproduction frame is not displayed. Then, the CPU 201 stops the reproduction of the video data in step S308.

Further, the CPU 201 can also determine that the reproduction frame is not within the display range of the window when not even a small portion of the reproduction frame is displayed in the window, and stop the reproduction of the video data. In this case, if at least one out of the following conditions, i.e. $r_x < L_x$, $l_x > R_x$, $r_y > L_y$, and $l_y < R_y$, is satisfied, the CPU 201 determines that the reproduction frame is not within the display range of the window (NO in step S504).

Further, according to the present exemplary embodiment, a case where the display state of the reproduction frame of the video data in the window is changed from a display state to a non-display state due to resizing or scrolling of the window has been described. However, the non-display state of the reproduction frame of the video data also occurs when the user changes tabs and a different web page is displayed in place of the reproduction frame. Accordingly, the reproduction frame of the video data is not displayed in the window. Thus, if the CPU 201 receives an instruction to change tabs on the window, the CPU 201 may determine that the state of the video data will be the non-display state and stop the reproduction of the video data.

Further, if the display state of the window itself is changed from the display state to the non-display state according to automatic activation of a screen saver, the reproduction frame of the video data will not be displayed. Thus, when the CPU 201 detects that the screen saver is activated, the CPU 201 determines that the video data will not be displayed, and stops the reproduction of the video data.

The resizing of the window includes minimization of the window. When the window is minimized, the reproduction frame of the video data is not displayed. Thus, if the CPU 201 receives an instruction to minimize the window, the CPU 201 determines that the video data will not be displayed, and may stop the reproduction of the video data.

According to the above described exemplary embodiment, when the video data is not displayed in the window, the reproduction of the video data is automatically stopped. In this manner, the reproduction of the video data when the user cannot view the video data is stopped and resources are prevented from being wasted due to the continuance of the reproduction of the video data. Further, it is also useful in preventing the video data from being reproduced before the user realizes that the reproduction has been forwarded.

Next, a case where the reproduction of the video data is started after the reproduction of the video data is stopped according to a change in the state of the reproduction frame in the window from the display state to the non-display state, and accordingly the display of the reproduction frame of the video data in the window is detected again, will be described.

Figure 7:
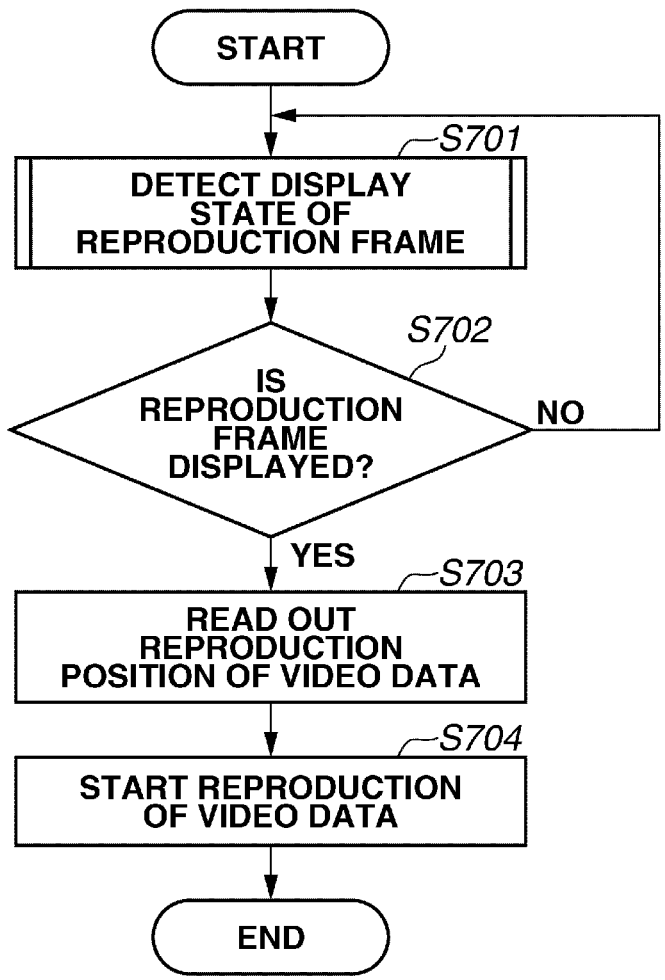
FIG. 7 is a flowchart illustrating an operation of the video reproduction apparatus.

The reproduction frame of the video data can be displayed again in the window by the user resizing or scrolling the window of the web browser, changing tabs, turning off the screen saver, or cancelling the minimization of the window. The operation of the video reproduction apparatus 102 according to the present exemplary embodiment will be described with reference to the flowchart in FIG. 7. The operations described below are realized by the CPU 201 of the video reproduction apparatus 102 starting the OS or the web browser and performing operations according to the OS or the web browser.

In step S701, after the CPU 201 stops the reproduction of the video data in step S312, the CPU 201 detects the display state of the reproduction frame. In step S702, the CPU 201 determines whether the reproduction frame is within the display range of the window. If the CPU 201 determines that the reproduction frame is within the display range of the window (YES in step S702), the processing proceeds to step S703. In step S703, the CPU 201 reads out the reproduction position of the video data from the RAM 202. In step S704, the CPU 201 acquires the video data from the storage device 204 and reproduces the video data from the reproduction position read out in step S703. The operation in step S701 is similar to the operation performed in step S309.

Further, the CPU 201 can determine whether the reproduction position read out in step S703 is the beginning of the video data. If the reproduction position is not the beginning of the video data, the reproduction of the video data can be started in step S704. If the reproduction position is the beginning of the video data, the CPU 201 can determine not to start the reproduction of the video data. In this manner, automatic reproduction of the video data which has not yet been reproduced by the user or the video data whose reproduction has been completed can be prevented. This improves convenience for the user.

Further, the CPU 201 can determine whether video data which is being reproduced in a different reproduction frame exists. If such video data is not being reproduced, the CPU 201 can start reproduction of the video data in step S704. If such video data is being reproduced, the CPU 201 can determine not to start the reproduction of the video data. Additionally, if the reproduction of the different video data ends, the CPU 201 can start reproducing the video data whose reproduction frame is displayed again in the window. Accordingly, the video data is not reproduced while the user is viewing another video data, and the user does not miss the video data that the user desires to view. Further, it can prevent sounds from being difficult to listen because a plurality of pieces of video data is reproduced overlapping one another.

Next, an example of a script of the web page according to the present exemplary embodiment will be described with reference to FIG. 6B. The script in FIG. 6B is added to the script illustrated in FIG. 6A. When the reproduction frame of the video data is moved into the display range of the window, an event "OnEnter" is generated, and the CPU 201 calls a function "MoviePlayerB_OnEnter". Then, when a method "SetPlayerEntrance" of the control plug-in is called, an event "OnStartPlayer" which starts the reproduction of video data is generated, and the CPU 201 calls a reproduction start method "Start" of the video reproduction plug-in.

Although the web page according to the present exemplary embodiment includes one piece of video data and its reproduction frame, a plurality of pieces of data and reproduction frames of the data can be included in the web page. In this case, if the CPU 201 detects that reproduction frames of a plurality of pieces of video data are displayed again in the window, from among the plurality of pieces of video data, reproduction of moving image data pieces are simultaneously started and, further, repeatedly reproduced. Audio data pieces can be reproduced in the order of the video data. In this manner, the user can listen to the sound of each piece of video data more easily.

Further, although the reproduction of the video data is started after the download of the video data is completed in the present exemplary embodiment, the video data can be reproduced while it is being downloaded.

For example, a case where the video transmission apparatus 101 transmits video data to the video reproduction apparatus 102 by streaming and video reproduction apparatus 102 reproduces the received video data will be described. After executing the processing in steps S301 to S305, the CPU 201 downloads a part of the video data from the video transmission apparatus 101 via a streaming server and stores the video data in a buffer. Then, the CPU 201 reproduces a part of the video data stored in the buffer in the reproduction frame.

Then, the processing in steps S308 to S309 is executed. Then, if the CPU 201 determines that the reproduction frame is displayed (YES in step S310), the successive part of the video data is repeatedly downloaded and reproduced.

On the other hand, if the CPU 201 determines that the reproduction frame is not displayed (NO in step S310), then in step S311, the CPU 201 stores the reproduction position of the video data, and stops the download and the reproduction of the video data. Then, the CPU 201 executes the processing in step S701. If the CPU 201 determines that the reproduction frame is displayed again (YES in step S702), the CPU 201 downloads a part of the video data from the video transmission apparatus 101 from the reproduction position stored in the storage device 204 (step S306), and reproduces the video data (step S307).

Further, a case where the video transmission apparatus 101 transmits video data to the video reproduction apparatus 102 by progressive download, and then the video reproduction apparatus 102 reproduces the video data will be described. The progressive download is to reproduce video data while the video data is being downloaded.

In this case, after executing the processing in steps S301 to S305, the CPU 201 downloads a part of the video data from the video transmission apparatus 101 via a hypertext transfer protocol (HTTP) server, stores the video data in a temporary folder of the storage device 204, and then reproduces a part of the video data stored in the temporary folder in the reproduction frame.

Then, the processing in steps S308 to S309 is executed. If the CPU 201 determines that the reproduction frame is displayed (YES in step S310), the successive part of the video data is repeatedly downloaded and reproduced.

On the other hand, if the CPU 201 determines that the reproduction frame is not displayed (NO in step S310), the CPU 201 stores the reproduction position of the video data (step S311), and stops the download and the reproduction of the video data (step S312). Then, the CPU 201 executes the processing in step S701. If the CPU 201 determines that the reproduction frame is displayed again (YES in step S702), the CPU 201 downloads a part of the video data from the video transmission apparatus 101 from the reproduction position stored in the storage device 204 (step S306), and reproduces the video data (step S307). In this manner, since the video data which is not yet reproduced is not downloaded and stored, a load on an amount of storage capacity of the video reproduction apparatus 102 can be reduced.

If the CPU 201 determines that the reproduction frame is not displayed (NO in step S310), the CPU 201 stores the reproduction position of the video data (step S311), stops only the reproduction of the video data, and continues the download of the video data. The downloaded video data can be stored in a temporary folder. Then, the CPU 201 executes the processing in step S701. If the CPU 201 determines that the reproduction frame is displayed again (YES in step S702), the CPU 201 acquires the video data from the temporary folder and reproduces the video data from the reproduction position stored in the storage device 204 (step S307). Since the video data which is not yet reproduced is downloaded and stored in advance, the user can reproduce the video data not only from the position where the reproduction has been stopped but can immediately reproduce the video data from a further position.

According to the present exemplary embodiment, if the reproduction frame of the video data is displayed again in the window, the reproduction of the video data can be automatically started. Accordingly, the user can watch the rest of the video data without performing special operations.

According to the present exemplary embodiment, a case where the video reproduction apparatus 102 downloads video data from the video transmission apparatus 101 and reproduces the video data in the reproduction frame of the window of the web browser has been described. Similarly, the present exemplary embodiment can be applied to a case where the video reproduction apparatus reads out video data from the storage device 204 and the video data is reproduced in the reproduction frame in the window of another application.

Further, although the reproduction of the video data is always stopped when the reproduction frame in the window of the video reproduction apparatus 102 is not displayed in the present exemplary embodiment, whether to stop or continue the reproduction can be changed according to a predetermined setting. For example, if it is set in advance in the storage device 204 that the reproduction of the video data is not to be stopped even if the video data is not displayed, even when the video data is not displayed in the window, the CPU 201 continues the reproduction of the video data. On the other hand, if it is set in advance in the storage device 204 that the reproduction of the video data is to be stopped when the video data is not displayed, the CPU 201 stops the reproduction of the video data when the video data in the window is not displayed. Accordingly, by making the setting in advance, the user can control the reproduction of the video data.

Further, the present invention can also be realized by executing the following processing. More specifically, software (a program) for realizing the functions of the above exemplary embodiment is supplied to a system or an apparatus via a network or various storage media and a computer (or CPU or micro processing unit (MPU)) of the system or the apparatus reads and executes the program.

Further, the functions of the above-described exemplary embodiment are realized not only when the computer executes a program code. For example, an operation system (OS) or the like, which runs on a computer, can execute a part or whole of the actual processing based on an instruction of the program code so that the functions of the above-described embodiment can be achieved. Furthermore, a case where the functions of the above-described exemplary embodiment are realized by the program code read out from the computer-readable storage medium is written in a memory in a function expansion board inserted in the computer or a function expansion unit connected to the computer and a CPU provided in the function expansion board or the function expansion unit performs the entire or a part of the actual processing based on an instruction from the program is also included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-111540 filed May 13, 2010, and No. 2011-101306 filed Apr. 28, 2011, which are hereby incorporated by reference herein in their entirety.

The invention claimed is:

1. A video reproduction apparatus comprising:
   a reproduction unit configured to reproduce video data in a window;
   an update unit configured to update a display content in the window if the window is scrolled; and
   a storage unit configured to store a reproduction position of a first video data if at least a part of the first video data disappears from the window as a result of the update;
   a determining unit configured to determine whether a second video data is being reproduced in the window if the first video data is going to be displayed in the window again as a result of the update, wherein the reproduction unit is capable of reproducing the second video data in the window while the first video data is not displayed in the window, wherein the reproduction unit starts reproducing the first video data from the stored reproduction position in response to at least a part of the first video data appearing in the window again as a result of the update if a result of the determination by the determining unit indicates that the second video data is not being reproduced in the window, and the reproduction unit does not start reproducing the first video data in response to at least a part of the first video data appearing in the window again as a result of the update if a result of the determination by the determining unit indicates that the second video data is is being reproduced in the window.

2. The video reproduction apparatus according to claim 1, further comprising:

a download unit configured to download the video data from an external apparatus via a network, wherein the download unit continues downloading the video data after at least the part of the video data disappears from the window as a result of the update.

3. The video reproduction apparatus according to claim 1, wherein the storage unit stores the reproduction position of the first video data if a ratio of area of a portion of the first video data which is not displayed in the window with respect to area of a whole of the first video data exceeds a predetermined value.

4. The video reproduction apparatus according to claim 1, further comprising:

a comparison unit configured to compare display positions of the window and the first video data, wherein the storage unit stores the reproduction position of the first video data in accordance with a result of the comparison.

5. The video reproduction apparatus according to claim 1, wherein the reproduction unit does not reproduce the first video data in spite of the first video data being displayed in the window again as a result of the update, in a case that the stored reproduction position is a predetermined position.

6. The video reproduction apparatus according to claim 1, wherein the reproduction unit reproduces the first video data from the stored reproduction position, if the second video data displayed in the window is being reproduced and at least the part of the first video data is displayed in the window again as a result of the update, after the reproduction of the second video data displayed in the window ends.

7. The video reproduction apparatus according to claim 1, further comprising:

a stopping unit configured to stop reproduction of the first video data if at least the part of the first video data disappears from the window as a result of the update.

8. A method for reproducing video data, the method comprising the steps of:

reproducing video data in a window;

updating a display content in the window if the window is scrolled;

storing a reproduction position of a first video data if at least a part of the first video data in disappears from the window as a result of the update;

determining whether a second video data is being reproduced in the window if the first video data is going to be displayed in the window again as a result of the update, reproducing the second video data in the window while the first video data is not displayed in the window, reproducing the first video data from the stored reproduction position in response to at least a part of the first video data appearing in the window as a result of the update if a result of the determination indicates that the second video data is not being reproduced in the window, and does not start reproducing the first video data in response to at least a part of the first video data appearing in the window again as a result of the update if a result of the determination indicates that the second video data is being reproduced in the window.

9. The method according to claim 8, further comprising:
downloading the video data from an external apparatus via a network; and
continuing downloading the video data after at least the part of the video data disappears from the window as a result of the update.

10. The method according to claim 8, further comprising:
storing the reproduction position of the first video data if a ratio of area of a portion of the first video data which is not displayed in the window with respect to area of a whole of the first video data exceeds a predetermined value.

11. The method according to claim 8, further comprising:
comparing display positions of the window and the first video data, wherein in the storing step, the reproduction position of the first video data is stored in accordance with a result of the comparison.

12. The method according to claim 8, wherein in the reproducing step, the first video data is not reproduced in spite of the first video data being displayed in the window again as a result of the update, in a case that the stored reproduction position is a predetermined position.

13. The method according to claim 8, wherein in the reproducing step, the first video data is reproduced from the stored reproduction position, if the second video data displayed in the window is reproducing and at least the part of the first video data is displayed in the window again as a result of the update, after the reproduction of the second video data displayed in the window ends.

14. The method according to claim 8, further comprising:
stopping reproduction of the first video data if at least the part of the first video data disappears from the window as a result of the update.

15. A non-transitory computer-readable storage medium storing a program causing a computer to perform operations, the program comprising:

reproducing video data in a window;

updating a display content in the window if the window is scrolled; and storing a reproduction position of a first video data if at least a part of the first video data disappears from the window as a result of the update;

determining whether a second video data is being reproduced in the window if the first video data is going to be displayed in the window again as a result of the update, wherein the reproducing is capable of reproducing the second video data in the window while the first video data is not displayed in the window, reproducing the first video data from the stored reproduction position in response to at least a part of the first video data appearing in the window as a result of the update if a result of the determining indicates that the second video data is not being reproduced in the window, and does not start reproducing the first video data in response to at least a part of the first video data appearing in the window again as a result of the update if a result of the determining indicates that the second video data is being reproduced in the window.

16. A video reproduction apparatus comprising:
  a reproduction unit configured to reproduce video data in a window;
  an update unit configured to update a display content in the window if the window is scrolled; and
  a stopping unit configured to stop a reproduction of a first video data if a ratio of area of a portion of the first video data which is not displayed in the window with respect to area of a whole of the first video data exceeds a predetermined value as a result of the update,
  a determining unit configured to determine whether a second video data is being reproduced in the window if the ratio becomes less than the predetermined value again as a result of the update, wherein the reproduction unit is capable of reproducing the second video data in the window while the ratio exceeds the predetermined value,
  wherein the reproduction unit starts reproducing the first video data from the stored reproduction position if the ratio becomes less than the predetermined value again as a result of the update and if a result of the determination by the determining unit indicates that the second video data is not being reproduced in the window, and the reproduction unit does not start reproducing the first video data if the ratio becomes less than the predetermined value again as a result of the update and if a result of the determination by the determining unit indicates that the second video data is is being reproduced in the window.

17. A method for reproducing video data, the method comprising the steps of:
  reproducing video data in a window;
  updating a display content in the window if the window is scrolled;
  stopping a reproduction of a first video data if a ratio of area of a portion of the first video data which is not displayed in the window with respect to area of a whole of the first video data exceeds a predetermined value as a result of the update,
  determining whether a second video data is being reproduced in the window if the ratio becomes less than the predetermined value again as a result of the update, wherein the reproduction is capable of reproducing the second video data in the window while the ratio exceeds the predetermined value,
  reproducing the first video data from the stored reproduction position if the ratio becomes less than the predetermined value again as a result of the update and if a result of the determination indicates that the second video data is not being reproduced in the window, and does not start reproducing the first video data if the ratio becomes less than the predetermined value again as a result of the update and if a result of the determination indicates that the second video data is being reproduced in the window.

18. A non-transitory computer-readable storage medium storing a program causing a computer to perform operations, the program comprising:
  reproducing video data in a window;
  updating a display content in the window if the window is scrolled; and
  stopping a reproduction of a first video data if a ratio of area of a portion of the first video data which is not displayed in the window with respect to area of a whole of the first video data exceeds a predetermined value as a result of the update,
  determining whether a second video data is being reproduced in the window if the ratio becomes less than the predetermined value again as a result of the update, reproducing the second video data in the window while the ratio exceeds the predetermined value,
  reproducing the first video data from the stored reproduction position if the ratio becomes less than the predetermined value again as a result of the update and if a result of the determination indicates that the second video data is not being reproduced in the window, and not reproducing the first video data if the ratio becomes less than the predetermined value again as a result of the update and if a result of the determination indicates that the second video data is being reproduced in the window.

19. A moving-image data reproducing apparatus comprising:
  a display unit configured to display a moving-image data in a window;
  a reproduction unit configured to reproduce the moving-image data;
  an update unit configured to update a display content in the window if the window is scrolled; and
  a storage unit configured to store a reproduction position of the moving-image data in response to a ratio of area of a non-display portion of the moving-image data to a whole of the moving-image data exceeding a predetermined value as a result of the update;
  a determining unit configured to determine whether another moving-image data is being reproduced in the window if the ratio becomes less than the predetermined value again as a result of the update, wherein the reproduction unit is capable of reproducing another moving-image data in the window while the ratio exceeds the predetermined value,
  wherein the reproduction unit starts reproducing the moving-image data from the stored reproduction position if the ratio becomes less than the predetermined value again as a result of the update and if a result of the determination by the determining unit indicates that another moving-image data is not being reproduced in the window, and the reproduction unit does not start reproducing the moving-image data if the ratio becomes less than the predetermined value again as a result of the update if a result of the determination by the determining unit indicates that another moving-image data is being reproduced in the window.

20. The moving-image data reproducing apparatus according to claim 19, further comprising:
  a download unit configured to download the moving-image data from an external apparatus via a network,
  wherein the download unit continues downloading the moving-image data after the ratio becomes less than the predetermined value as a result of the update.

21. A method for reproducing moving-image data, the method comprising the steps of:
  displaying a moving-image data in a window;
  reproducing the moving-image data;
  updating a display content in the window if the window is scrolled; and
  storing a reproduction position of the moving-image data in response to a ratio of area of a non-display portion of the moving-image data to a whole of the moving-image data exceeding a predetermined value as a result of the update;
  determining whether another moving-image data is being reproduced in the window if the ratio becomes less than the predetermined value again as a result of the update, reproducing another moving-image data in the window while the ratio exceeds the predetermined value, reproducing the moving-image data from the stored reproduction position if the ratio becomes less than the predetermined value as a result of the update and if a result of the determination indicates that another moving-image data is not being reproduced in the window, and not reproducing the moving-image data if the ratio becomes less than the predetermined value as a result of the update if a result of the determination indicates that another moving-image data is being reproduced in the window.

22. A non-transitory computer-readable storage medium storing a program causing a computer to perform operations, the program comprising:

displaying a moving-image data in a window;

reproducing the moving-image data;

updating a display content in the window if the window is scrolled;

storing a reproduction position of the moving-image data in response to a ratio of area of a non-display portion of the moving-image data to a whole of the moving-image data exceeding a predetermined value as a result of the update; and determining whether another moving-image data is being reproduced in the window if the ratio becomes less than the predetermined value again as a result of the update, reproducing another moving-image data in the window while the ratio exceeds the predetermined value, reproducing the moving-image data from the stored reproduction position if the ratio becomes less than the predetermined value as a result of the update and if a result of the determination indicates that another moving-image data is not being reproduced in the window, and not reproducing the moving-image data if the ratio becomes less than the predetermined value as a result of the update if a result of the determination indicates that another moving-image data is being reproduced in the window.

* * * * *